(No Model.)

M. CAHEN.
SKINNING KNIFE.

No. 518,223. Patented Apr. 17, 1894.

Attest

Inventor
M. Cahen
by Richards & Co
Attys

UNITED STATES PATENT OFFICE.

MARCUS CAHEN, OF MÜLHEIM, GERMANY.

SKINNING-KNIFE.

SPECIFICATION forming part of Letters Patent No. 518,223, dated April 17, 1894.

Application filed June 24, 1893. Serial No. 478,743. (No model.)

*To all whom it may concern:*

Be it known that I, MARCUS CAHEN, a subject of the Emperor of Germany, residing at Mülheim, Germany, have invented certain new and useful Improvements in Apparatus for Skinning Cattle, of which the following is a full, clear, and exact description.

My invention is an improved instrument for removing the skin from slaughtered cattle and consists of the details of construction hereinafter fully described and particularly claimed.

Figure 1:
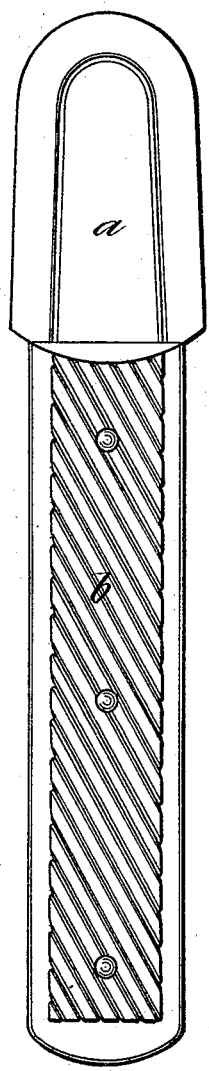
Figure 2:
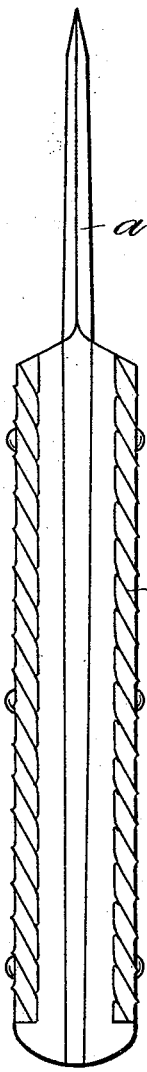
Figure 3:
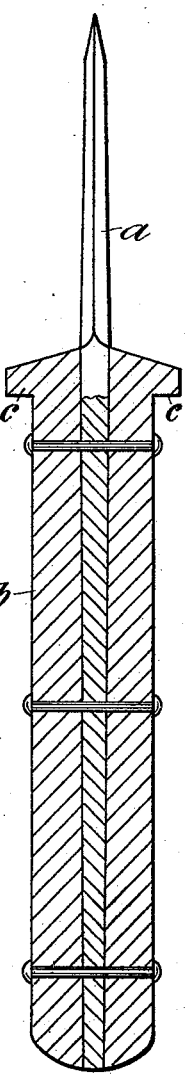
Figure 4:

In the accompanying drawings:—Figure 1— represents an elevation of the instrument. Fig. 2— is a side elevation of the instrument. Fig. 3— is a like view of a modification with the handle and tang in section. Fig. 4— is an elevation of a modification, and Fig. 5— is a like view with the blade a quarter turned from the position of Fig. 4.

In the figures the blade is shown at *a*, and this is approximately U shaped, having a flat center with the edge of the U around the entire periphery of the blade beveled on each side, so as to form a cutting edge. The tang of the blade *a*, passes between the side plates forming a handle *d*, which is secured to the tang by bolts or rivets. These side plates which form the haft of the handle are preferably roughened as shown in Figs. 1, 2, 4, and 5— so as to enable the workman to grasp the handle securely.

If desired the handle may, as in Fig. 3, be formed with a projecting flange *c*, at the end nearest the blade, so as to protect the hand of the workman and prevent his hand from coming in contact with the cutting edge.

Figure 5:
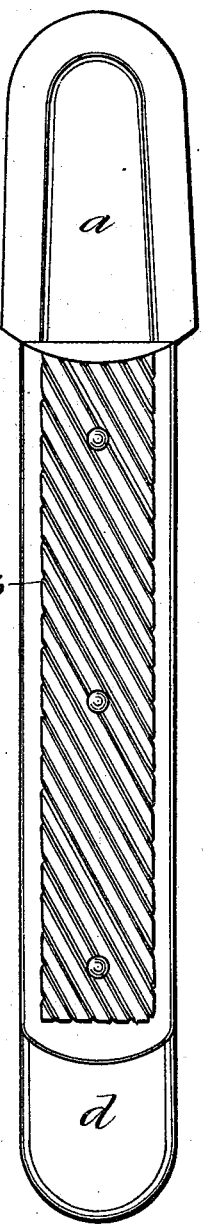

In Figs. 4 and 5 I have shown the tang of the blade projecting at the opposite end of the handle, as at *d*, as I find it very desirable to use this projecting end in beating the skin. The corners are rounded off so as to prevent cutting the skin.

I have found in practice, the peculiar form of the cutting blade has many advantages and while allowing very rapid work, does not in any way damage the hide. The plate is introduced under the skin after the first incision and the skin itself serves as a guide for the blade in its movement under the same.

Having thus described my invention, what I claim, and desire to secure by Letters Patent, is—

In combination with a suitable handle, flanges *c* at the end thereof, a blade of U shape having a continuous edge of like shape beveled throughout the entire extent of the blade, and the shank having an integral extension *d* beyond the handle substantially as described.

In testimony whereof I have signed this specification in the presence of two subscribing witnesses.

MARCUS CAHEN.

Witnesses:
   G. WOLF IZARD,
   FRITZ SCHROEDER.